(12) United States Patent
Kojima

(10) Patent No.: US 8,329,799 B2
(45) Date of Patent: Dec. 11, 2012

(54) RUBBER COMPOSITION FOR STUDLESS TIRE AND STUDLESS TIRE

(75) Inventor: Ryoji Kojima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 275 days.

(21) Appl. No.: 12/943,172

(22) Filed: Nov. 10, 2010

(65) Prior Publication Data

US 2011/0112215 A1 May 12, 2011

(30) Foreign Application Priority Data

Nov. 12, 2009 (JP) ................... 2009-259269

(51) Int. Cl.
*C08K 5/04* (2006.01)

(52) U.S. Cl. .................... 524/398; 524/571; 524/575.5; 524/534

(58) Field of Classification Search .................. 524/398, 524/534, 575.5, 571
See application file for complete search history.

(56) References Cited

FOREIGN PATENT DOCUMENTS

| JP | 6-240052 A | 8/1994 |
|---|---|---|
| JP | 2007-107015 A | 4/2007 |
| JP | 2007-277437 A | 10/2007 |
| JP | 2007-321039 A | 12/2007 |
| JP | 2007-321041 A | 12/2007 |
| JP | 2009-79206 A | 4/2009 |
| JP | 2009-102618 A | 5/2009 |
| JP | 2010-59251 A | 3/2010 |
| JP | 2010-76744 A | 4/2010 |
| JP | 2011-38057 A | 2/2011 |

*Primary Examiner* — Peter D Mulcahy
(74) *Attorney, Agent, or Firm* — Birch, Stewart, Kolasch & Birch, LLP

(57) ABSTRACT

The invention provides a rubber composition for studless tire achieving well-balanced abrasion resistance, performance on ice and snow, handling stability, and wet grip performance; and a studless tire including a tread produced from the composition. The composition contains: a rubber component; aromatic oil; silica; carbon black; and a mixture of a zinc salt of aliphatic carboxylic acid and a zinc salt of aromatic carboxylic acid, wherein the total of NR and BR in 100% by mass of the rubber component is 30% by mass or more, the amount of aromatic oil is 12-85 parts by mass, the amount of silica is 12-85 parts by mass, and the amount of mixture is 1 part by mass or more, per 100 parts by mass of the rubber component, and the proportion of silica is 45% by mass or more per 100% by mass of the total of the silica and carbon black.

7 Claims, No Drawings

RUBBER COMPOSITION FOR STUDLESS TIRE AND STUDLESS TIRE

TECHNICAL FIELD

The present invention relates to a rubber composition for a studless tire (a winter tire) and a studless tire.

BACKGROUND ART

Use of spike tires has been banned by law in Japan so as to prevent powder dust pollution resulting from the use of spike tires, and thus studless tires are now used instead of the spike tires in cold regions. Studless tires have been improved in their materials and designs for driving on icy or snowy roads having a rougher surface than that of a normal road. For example, a rubber composition has been developed which contains diene rubber having excellent low-temperature properties and contains a softening agent in an increased amount so that a softening effect increases. Here, mineral oil is generally used as the softening agent in order to improve low-temperature properties.

If the amount of mineral oil is increased to improve low-temperature properties, abrasion resistance usually deteriorates. One way of solving such a problem is to use aromatic oil in place of the mineral oil; however, this way deteriorates low-temperature properties and thus makes it difficult to achieve sufficient performance on ice and snow. In contrast, combination use of aromatic oil and silica allows improvement of low-temperature properties without reducing abrasion resistance, but still cannot achieve sufficient levels of these performances. Further, improvement in handling stability and wet grip performance, as well as performance on ice and snow and abrasion resistance, is also desired.

Patent Document 1, for example, discloses a rubber composition for a tread, which contains ingredients such as natural rubber, butadiene rubber, silica, and aromatic oil. This composition can still be improved in terms of achieving better handling stability and wet grip performance in addition to both abrasion resistance and performance on ice and snow (low-temperature properties).

Patent Document 1: JP H06-240052 A

SUMMARY OF THE INVENTION

The present invention aims to solve the above problems, and to provide a rubber composition for a studless tire, which can achieve sufficient abrasion resistance, performance on ice and snow, handling stability (particularly handling stability on ice and snow), and wet grip performance in a balanced manner. The present invention also aims to provide a studless tire having a tread produced from the above rubber composition.

A first aspect of the present invention relates to a rubber composition for a studless tire, containing: a rubber component including natural rubber and butadiene rubber; an aromatic oil; silica; carbon black; and a mixture of a zinc salt of an aliphatic carboxylic acid and a zinc salt of an aromatic carboxylic acid, wherein the total amount of the natural rubber and the butadiene rubber is 30% by mass or more based on 100% by mass of the rubber component; the amount of the aromatic oil is 12 to 85 parts by mass, the amount of the silica is 12 to 85 parts by mass, and the amount of the mixture is 1 part by mass or more, per 100 parts by mass of the rubber component; and the proportion of the silica is 45% by mass or more based on 100% by mass of the total amount of the silica and the carbon black.

A second aspect of the present invention relates to a rubber composition for a studless tire, containing: a rubber component including natural rubber and butadiene rubber; an aromatic oil; silica; carbon black; sulfur; and an alkylphenol-sulfur chloride condensate represented by the following formula (I):

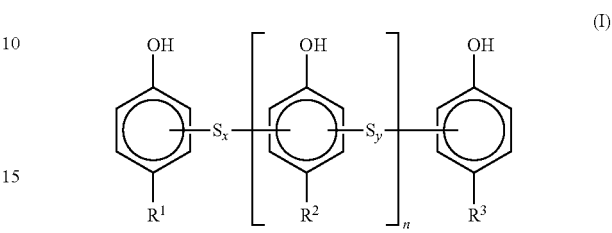

wherein $R^1$ to $R^3$ are the same as or different from one another and each represent a C5-C12 alkyl group, x and y are the same as or different from one another and each represent an integer from 2 to 4, and n represents an integer from 0 to 10, wherein the total amount of the natural rubber and the butadiene rubber is 30% by mass or more based on 100% by mass of the rubber component, the amount of the aromatic oil is 12 to 85 parts by mass, the amount of the silica is 12 to 85 parts by mass, the amount of the alkylphenol-sulfur chloride condensate is 0.25 to 6.0 parts by mass, and the total amount of sulfur in the sulfur and the alkylphenol-sulfur chloride condensate is 0.3 to 3 parts by mass, per 100 parts by mass of the rubber component, and the proportion of the silica is 45% by mass or more based on 100% by mass of the total amount of the silica and the carbon black.

Each of the rubber compositions is preferably used for a tread.

The present invention also relates to a studless tire having a tread produced from each of the rubber compositions.

The rubber composition of the present invention contains natural rubber, butadiene rubber, an aromatic oil, silica, carbon black, and a mixture of a zinc salt of an aliphatic carboxylic acid and a zinc salt of an aromatic carboxylic acid or an alkylphenol-sulfur chloride condensate and sulfur, in predetermined amounts. Using the rubber composition for a tread allows production of a studless tire achieving sufficient abrasion resistance, performance on ice and snow, handling stability (particularly handling stability on ice and snow), and wet grip performance in a balanced manner.

BEST MODE FOR CARRYING OUT THE INVENTION

A first rubber composition for a studless tire according to the present invention contains a rubber component including natural rubber and butadiene rubber, an aromatic oil, silica, carbon black, and a mixture of a zinc salt of an aliphatic carboxylic acid and a zinc salt of an aromatic carboxylic acid, in predetermined amounts. A second rubber composition for a studless tire according to the present invention contains a rubber component including natural rubber and butadiene rubber, an aromatic oil, silica, carbon black, sulfur, and an alkylphenol-sulfur chloride condensate represented by the above formula (I), in predetermined amounts. Both the first and second rubber compositions therefore can improve abrasion resistance, performance on ice and snow, handling stability (particularly handling stability on ice and snow), and wet grip performance in a balanced manner.

The first and second rubber compositions each include both natural rubber and butadiene rubber in the rubber component. This makes it possible to improve low-temperature properties and thus to improve performance on ice and snow. Butadiene rubber, particularly, is an important ingredient for securing the performance on ice.

Examples of the natural rubber (NR) include rubbers generally used in the tire industry, such as SIR20, RSS #3, and TSR20. Examples of the natural rubber (NR) also include modified natural rubbers such as deproteinized natural rubber (DPNR), highly purified natural rubber (HPNR), epoxidized natural rubber (ENR), hydrogenated natural rubber (HNR), and grafted natural rubber. Each of these may be used alone, or two or more of these may be used in combination.

The butadiene rubber (BR) preferably has a cis content of 80% by mass or more. This results in an increase in abrasion resistance. The cis content is more preferably 85% by mass or more, still more preferably 90% by mass or more, and most preferably 95% by mass or more.

Further, the BR preferably has a viscosity of 30 cps or more in the form of a 5% solution in toluene at 25° C. A viscosity of less than 30 cps may greatly deteriorate processability and may also deteriorate abrasion resistance. The viscosity of the BR solution in toluene is preferably 100 cps or less, and, more preferably 70 cps or less. A viscosity of more than 100 cps may also deteriorate processability.

Additionally, in consideration of improvement in both processability and abrasion resistance, BR having an Mw/Mn ratio of 3.0 to 3.4 is preferable.

Examples of the BR include, but are not particularly limited to, BRs with a high cis content, such as BR1220 produced by Zeon Corporation, and BR130B and BR150B produced by Ube Industries, Ltd.; and BRs containing a syndiotactic polybutadiene crystal, such as VCR412 and VCR617 produced by Ube Industries, Ltd.

The amount of the NR is preferably 30% by mass or more, more preferably 40% by mass or more, still more preferably 50% by mass or more, and particularly preferably 55% by mass or more, based on 100% by mass of the rubber component. An amount of the NR of less than 30% by mass may greatly decrease tensile strength and thus make it difficult to secure abrasion resistance. The amount of the NR is preferably 80% by mass or less, more preferably 70% by mass or less, and still more preferably 65% by mass or less, based on 100% by mass of the rubber component. An amount of the NR of more than 80% by mass may deteriorate low-temperature properties and thus may not be able to secure the performance on ice, which is necessary for a studless tire.

The amount of the BR is preferably 10% by mass or more, more preferably 20% by mass or more, still more preferably 30% by mass or more, and particularly preferably 35% by mass or more, based on 100% by mass of the rubber component. The amount of the BR of 10% by mass or more allows the rubber composition for a studless tire to exert its required performance on ice. The amount of the BR is preferably 80% by mass or less, more preferably 70% by mass or less, and still more preferably 60% by mass or less, based on 100% by mass of the rubber component. An amount of the BR of more than 80% by mass may greatly deteriorate processability and lead to occurrence of whitening due to bleeding of chemical agents.

The total amount of the NR and the BR is 30% by mass or more, preferably 60% by mass or more, more preferably 80% by mass or more, and most preferably 100% by mass, based on 100% by mass of the rubber component. The larger the total amount of the NR and the BR, the better the low-temperature properties, which leads to achievement of the required performance on ice.

The rubber composition may contain other rubbers as long as they do not inhibit the effects of the present invention. Examples of the other rubbers include styrene-butadiene rubber (SBR), isoprene rubber (IR), ethylene-propylene-diene rubber (EPDM), chloroprene rubber (CR), acrylonitrile-butadiene rubber (NBR), butyl rubber (IIR), and hologenated butyl rubber (X-IIR).

The first and second rubber compositions of the present invention each contain a comparatively large amount of aromatic oil. In the case of using mineral oil, which has excellent low-temperature properties, the mineral oil secures sufficient performance on ice and snow but deteriorates abrasion resistance. If the amount of mineral oil is decreased to secure abrasion resistance, the low-temperature properties are deteriorated and therefore performance on ice and snow is decreased; accordingly, conflicting performances, performance on ice and snow and abrasion resistance, cannot be achieved at the same time. In contrast, aromatic oil does not greatly reduce abrasion resistance even when the blended amount thereof is large, which can lead to achievement of both the performance on ice and snow and the abrasion resistance. Being contained in the rubber composition together with a large amount of silica, aromatic oil can contribute to achievement of both the performance on ice and snow and the abrasion resistance at a higher level.

The aromatic oil according to the present invention, for example, preferably has an aromatic hydrocarbon content in mass percentage (as determined in accordance with ASTM D2140) of 15% by mass or more. More specifically, process oil contains aromatic hydrocarbon ($C_A$), paraffinic hydrocarbon ($C_P$), and naphthenic hydrocarbon ($C_N$) in terms of molecular structure. Process oil is roughly classified as aromatic oil, paraffinic oil, or naphthenic oil, based on the contents of $C_A$ (% by mass), $C_P$ (% by mass), and $C_N$ (% by mass). In view of this, the aromatic oil according to the present invention preferably has a $C_A$ content of 15% by mass or more, and more preferably of 17% by mass or more. Also, the aromatic oil according to the present invention preferably has a $C_A$ content of 70% by mass or less, and more preferably of 65% by mass or less.

Examples of commercially available aromatic oil products include AC-12, AC-460, AH-16, AH-24, and AH-58 produced by Idemitsu Kosan Co., Ltd., and Process NC300S produced by Japan Energy Corporation.

The amount of the aromatic oil is 12 parts by mass or more, preferably 15 parts by mass or more, more preferably 30 parts by mass or more, particularly preferably 45 parts by mass or more, and most preferably 60 parts by mass or more, per 100 parts by mass of the rubber component. A larger amount of the aromatic oil leads to a better softening effect and better low-temperature properties, which results in improvement in performance on ice and snow. The amount of the aromatic oil is preferably 85 parts by mass or less, and more preferably 80 parts by mass or less, per 100 parts by mass of the rubber component. An amount of the aromatic oil of more than 85 parts by mass may deteriorate properties such as processability, abrasion resistance, and aging resistance.

The first and second rubber compositions of the present invention each contain a comparatively large amount of silica. The rubber composition containing silica together with aromatic oil can achieve both sufficient abrasion resistance and sufficient performance on ice and snow, and at the same time can improve wet grip performance which has been considered as a weakness of a studless tire. Examples of the silica include, but are not particularly limited to, silica produced by a wet process and silica produced by a dry process.

The nitrogen adsorption specific surface area ($N_2SA$) of the silica is preferably 80 $m^2/g$ or larger, more preferably 120 $m^2/g$ or larger, and still more preferably 150 $m^2/g$ or larger. An $N_2SA$ of the silica of smaller than 80 $m^2/g$ may greatly deteriorate tensile strength and make it difficult to secure abrasion resistance. Also, the $N_2SA$ of the silica is preferably 250 $m^2/g$ or smaller, more preferably 220 $m^2/g$ or smaller, and still more preferably 180 $m^2/g$ or smaller. An $N_2SA$ of the silica of larger than 250 $m^2/g$ may greatly increase the viscosity of the rubber composition containing such silica, resulting in deterioration of processability.

Here, the $N_2SA$ of the silica is determined by the BET method in accordance with ASTM D3037-81.

The amount of the silica is 12 parts by mass or more, preferably 15 parts by mass or more, more preferably 30 parts by mass or more, and still more preferably 45 parts by mass or more, per 100 parts by mass of the rubber component. Blending of the silica in an amount of 12 parts by mass or more can lead to achievement of sufficient performance on ice and snow, which is necessary for a studless tire. Also, the amount of the silica is 85 parts by mass or less, preferably 80 parts by mass or less, more preferably 70 parts by mass or less, and still more preferably 60 parts by mass or less, per 100 parts by mass of the rubber component. An amount of the silica of more than 85 parts by mass may deteriorate processability and workability, and lead to poor low-temperature properties due to the increase in the filler amount.

The rubber composition preferably contains a silane coupling agent together with silica.

Any silane coupling agent conventionally used with silica in the rubber industries can be used as the silane coupling agent. Examples thereof include sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, and bis(4-trimethoxysilylbutyl)disulfide. Among these, bis(3-triethoxysilylpropyl)disulfide is preferable which is inexpensive and readily available. Each of these silane coupling agents may be used alone, or two or more of these may be used in combination.

The amount of the silane coupling agent is preferably 2 parts by mass or more, and more preferably 3 parts by mass or more, per 100 parts by mass of the silica. An amount of the silane coupling agent of less than 2 parts by mass may not result in sufficient effects that should be achieved by addition of the silane coupling agent. Also, the amount of the silane coupling agent is preferably 20 parts by mass or less, and more preferably 15 parts by mass or less, per 100 parts by mass of the silica. An amount of the silane coupling agent of more than 20 parts by mass may deteriorate reinforcement and abrasion resistance.

The rubber compositions of the present invention each contain carbon black, which provides reinforcement. Further, use of the carbon black in combination with the NR, the BR, the aromatic oil, the silica, and the mixture or the alkylphenol-sulfur chloride condensate can improve abrasion resistance, performance on ice and snow, handling stability, and wet grip performance in a balanced manner. Examples of the carbon black include, but are not particularly limited to, SAF, ISAF, HAF, FF, and GPF.

The carbon black preferably has an average particle size of 31 nm or smaller and/or a DBP oil absorption of 100 ml/100 g or more. Addition of such carbon black achieves the required reinforcement, can secure block rigidity, uneven-wear resistance, and tensile strength, and leads to achievement of favorable effects of the present invention.

An average particle size of the carbon black of larger than 31 nm may greatly deteriorate tensile strength and make it difficult to secure abrasion resistance. The average particle size of the carbon black is more preferably 25 nm or smaller, and still more preferably 23 nm or smaller. Also, the average particle size of the carbon black is preferably 15 nm or larger, and more preferably 19 nm or larger. An average particle size of the carbon black of smaller than 15 nm may greatly increase the viscosity of the rubber composition containing such carbon black, and deteriorate processability. In the present invention, the average particle size is a number-average particle size, and can be measured with a transmission electron microscope.

A DBP oil absorption (dibutyl phthalate oil absorption) of the carbon black of less than 100 ml/100 g may lead to low reinforcement and make it difficult to secure abrasion resistance. The DBP oil absorption of the carbon black is more preferably 105 ml/100 g or more, and still more preferably 110 ml/100 g or more. Also, the DBP oil absorption of the carbon black is preferably 160 ml/100 g or less, and more preferably 150 ml/100 g or less. In the case of a DBP oil absorption of more than 160 ml/100 g, production of the carbon itself may be difficult.

Here, the DBP oil absorption of the carbon black can be measured in accordance with the measuring method described in JIS K6217-4.

The nitrogen adsorption specific surface area ($N_2SA$) of the carbon black is preferably 80 $m^2/g$ or larger, and more preferably 110 $m^2/g$ or larger. An $N_2SA$ of smaller than 80 $m^2/g$ may greatly deteriorate tensile strength and make it difficult to secure abrasion resistance. Also, the $N_2SA$ of the carbon black is preferably 200 $m^2/g$ or smaller, and more preferably 150 $m^2/g$ or smaller. An $N_2SA$ of larger than 200 $m^2/g$ may greatly increase the viscosity of the rubber composition containing such carbon black, and thus deteriorate processability.

Here, the $N_2SA$ of the carbon black can be determined in accordance with the method A described in JIS K6217.

The amount of the carbon black is preferably 2 parts by mass or more, more preferably 3 parts by mass or more, and still more preferably 5 parts by mass or more, per 100 parts by mass of the rubber component. An amount of the carbon black of less than 2 parts by mass may greatly deteriorate weather resistance and ozone resistance. Also, the amount of the carbon black is preferably 50 parts by mass or less, more preferably 30 parts by mass or less, still more preferably 20 parts by mass or less, and particularly preferably 15 parts by mass or less, per 100 parts by mass of the rubber component. An amount of the carbon black of more than 50 parts by mass may deteriorate low-temperature properties, and therefore may not be able to secure the performance on ice, which is necessary for a studless tire.

The proportion of the silica is 45% by mass or more, preferably 50% by mass or more, and more preferably 55% by mass or more, based on 100% by mass of the total amount of the silica and the carbon black. A proportion of the silica of less than 45% by mass may not result in achievement of both performance on ice and abrasion resistance. Also, the proportion of the silica is preferably 95% by mass or less, more preferably 93% by mass or less, and still more preferably 90% by mass or less, based on 100% by mass of the total amount of the silica and the carbon black. A proportion of the silica of more than 95% by mass may greatly deteriorate weather resistance and ozone resistance.

The first rubber composition contains a mixture of a zinc salt of an aliphatic carboxylic acid and a zinc salt of an aromatic carboxylic acid, as well as the rubber component, the aromatic oil, the silica, and the carbon black. Blending large amounts of the aromatic oil and the silica makes it possible to improve performance on ice and snow and abrasion resistance in a balanced manner; however, the large amount of the oil causes a decrease in the crosslink density of the tread rubber to be produced, and thus decreases the hardness. This leads to a decrease in handling stability and wet grip performance of the studless tire to be produced. The mixture contained in the first rubber composition can prevent insufficient crosslink density, which is a weakness caused by blending a large amount of oil. Thereby, the first rubber composition can secure the hardness required for a studless tire. Accordingly, the first rubber composition can achieve both sufficient performance on ice and snow and abrasion resistance, and can also improve handling stability (particularly handling stability on ice and snow) and wet grip performance. That is, the first rubber composition can improve abrasion resistance, performance on ice and snow, handling stability, and wet grip performance in a balanced manner.

NR usually suffers from reversion. The above mixture can effectively inhibit the reversion of NR, and also the reversion of BR. Hence, the mixture, when contained in the rubber composition with any content of NR and BR, can provide reversion inhibition effects, whereby the effects of the present invention can be produced favorably.

With regard to the zinc salt of an aliphatic carboxylic acid, examples of the aliphatic carboxylic acid include: aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; and aliphatic carboxylic acids chemically synthesized from petroleum or the like. Among these, vegetable oil-derived aliphatic carboxylic acids are preferable and aliphatic carboxylic acids derived from coconut oil, palm kernel oil, or palm oil are more preferable, because they are environment-friendly and it is possible to prepare for a future decrease in oil supply and to inhibit reversion sufficiently.

The number of carbon atoms of the aliphatic carboxylic acid is preferably 4 or more, and more preferably 6 or more. The number of carbon atoms of the aliphatic carboxylic acid of less than 4 tends to deteriorate the dispersibility. The number of carbon atoms of the aliphatic carboxylic acid is preferably 16 or less, more preferably 14 or less, and still more preferably 12 or less. The number of carbon atoms of the aliphatic carboxylic acid of more than 16 tends not to allow sufficient inhibition of reversion.

The aliphatic group in the aliphatic carboxylic acid may be one having a chain structure, such as an alkyl group, or one having a ring structure, such as a cycloalkyl group.

With regard to the zinc salt of an aromatic carboxylic acid, examples of the aromatic carboxylic acid include benzoic acid, phthalic acid, mellitic acid, hemimellitic acid, trimellitic acid, diphenic acid, toluic acid, and naphthoic acid. Among these, benzoic acid, phthalic acid, and naphthoic acid are preferable as they can sufficiently inhibit reversion.

The content ratio of the zinc salt of an aliphatic carboxylic acid to the zinc salt of an aromatic carboxylic acid [molar ratio: (zinc salt of aliphatic carboxylic acid)/(zinc salt of aromatic carboxylic acid), hereinafter referred to as "content ratio"] in the mixture is preferably 1/20 or more, more preferably 1/15 or more, and still more preferably 1/10 or more. A content ratio of less than 1/20 may fail to contribute to being environment-friendly and to prepare for a future decrease in oil supply. Further, such a content ratio tends to deteriorate the dispersibility and stability of the mixture. The content ratio is preferably 20/1 or less, more preferably 15/1 or less, and still more preferably 10/1 or less. A content ratio of more than 20/1 tends not to allow sufficient inhibition of reversion.

The zinc content in the mixture is preferably 3% by mass or more, and more preferably 5% by mass or more. A zinc content in the mixture of less than 3% by mass tends not to allow sufficient inhibition of reversion. The zinc content in the mixture is preferably 30% by mass or less, and more preferably 25% by mass or less. A zinc content in the mixture of more than 30% by mass tends to deteriorate processability.

The amount of the mixture in the first rubber composition is 1 part by mass or more, and preferably 2 parts by mass or more, per 100 parts by mass of the rubber component. An amount of the mixture of less than 1 part by mass may not provide improvement effects that should be achieved by addition of the mixture. The amount of the mixture in the first rubber composition is preferably 6 parts by mass or less, more preferably 5 parts by mass or less, still more preferably 4 parts by mass or less, and particularly preferably 3 parts by mass or less, per 100 parts by mass of the rubber component. Increasing the amount of the mixture to more than 6 parts by mass tends not to lead to larger effects.

The second rubber composition contains both an alkylphenol-sulfur chloride condensate represented by the following formula (I) and sulfur as crosslinking agents (vulcanizing agents) in predetermined amounts, as well as the rubber component, the aromatic oil, the silica, and the carbon black.

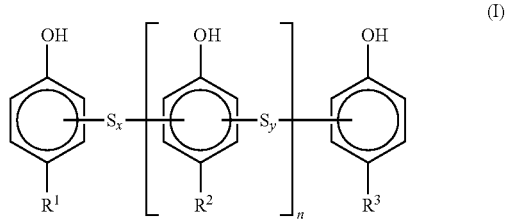

(I)

In the formula, $R^1$ to $R^3$ are the same as or different from one another and each represent a C5-C12 alkyl group. "x" and "y" are the same as or different from one another and each represent an integer from 2 to 4. "n" represents an integer from 0 to 10.

This formulation provides the same effects as those produced by blending the mixture in the first rubber composition. More specifically, the formulation leads to improvement in abrasion resistance, performance on ice and snow, handling stability, and wet grip performance in a balanced manner.

"n" is an integer from 0 to 10 in terms of good dispersibility of the alkylphenol-sulfur chloride condensate into the rubber component, and is preferably an integer from 1 to 9. Each of x and y is an integer from 2 to 4 in terms of efficient achievement of high hardness (inhibition of reversion), and is preferably an integer of 2. Each of $R^1$ to $R^3$ is a C5-C12 alkyl group in terms of good dispersibility of the alkylphenol-sulfur chloride condensate into the rubber component, and is preferably a C6-C9 alkyl group.

The alkylphenol-sulfur chloride condensate can be prepared by a known method. Examples of known methods include, but are not particularly limited to, a method of reacting an alkylphenol and sulfur chloride at a molar ratio of 1:0.9-1.25 or the like.

Specific examples of the alkylphenol-sulfur chloride condensate include Tackirol V200 (represented by the following formula (II)) produced by Taoka Chemical Co., Ltd.

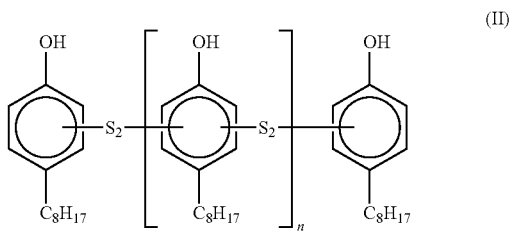

In the formula, "n" represents an integer from 0 to 10.

The sulfur content in the alkylphenol-sulfur chloride condensate refers to a value that is obtained by heating the condensate up to 800 to 1000° C. in a combustion furnace for conversion to $SO_2$ gas or $SO_3$ gas, and then optically determining the amount of sulfur from the amount of the generated gas.

The amount of the alkylphenol-sulfur chloride condensate in the second rubber composition is 0.25 parts by mass or more, and preferably 1 part by mass or more, per 100 parts by mass of the rubber component. An amount of less than 0.25 parts by mass may result in insufficient crosslink density and thus may not improve handling stability and wet grip performance. The amount of the alkylphenol-sulfur chloride condensate in the second rubber composition is 6.0 parts by mass or less, and preferably 5.0 parts by mass or less, per 100 parts by mass of the rubber component. An amount of more than 6.0 parts by mass may result in too high crosslink density and thus may decrease tensile strength and deteriorate abrasion resistance.

Examples of the sulfur include sulfur powder, precipitated sulfur, colloidal sulfur, insoluble sulfur, and high dispersion sulfur.

The amount of the sulfur in the second rubber composition is preferably 0.2 parts by mass or more, more preferably 0.5 parts by mass or more, and still more preferably 0.7 parts by mass or more, per 100 parts by mass of the rubber component. An amount of less than 0.2 parts by mass may not result in improvement of handling stability and wet grip performance. The amount of the sulfur is preferably 4 parts by mass or less, more preferably 3 parts by mass or less, and still more preferably 2 parts by mass or less, per 100 parts by mass of the rubber component. An amount of more than 4 parts by mass may result in too high crosslink density and thus decrease tensile strength and deteriorate abrasion resistance.

The amount of sulfur herein means the amount of pure sulfur, and refers, in the case of using insoluble sulfur, to the amount of pure sulfur excluding oil.

The total amount of sulfur in the sulfur and the alkylphenol-sulfur chloride condensate, both of which are crosslinking agents used in the second rubber composition, is 0.3 parts by mass or more, preferably 0.7 parts by mass or more, and more preferably 1.0 part by mass or more, per 100 parts by mass of the rubber component. A total amount of sulfur of less than 0.3 parts by mass may not result in improvement in handling stability and wet grip performance. The total amount of sulfur is 3 parts by mass or less, preferably 2.5 parts by mass or less, and more preferably 2.3 parts by mass or less, per 100 parts by mass of the rubber component. A total amount of sulfur of more than 3 parts by mass may result in too high crosslink density and thus decrease tensile strength and deteriorate abrasion resistance.

The total amount of sulfur in the sulfur and the alkylphenol-sulfur chloride condensate herein refers to the total amount of pure sulfur therein.

The first and second rubber compositions each may optionally contain compounding ingredients generally used in the rubber industries, in addition to the above ingredients. Examples of the compounding ingredients include other fillers, stearic acid, antioxidants, age resistors, zinc oxide, and vulcanization accelerators. Further, the first rubber composition may contain sulfur (vulcanizing agent).

Preferable vulcanization accelerators are sulfenamide vulcanization accelerators (such as N-tert-butyl-2-benzothiazolyl sulfenamide (TBBS), N-cyclohexyl-2-benzothiazolyl sulfenamide (CBS), N,N-dicyclohexyl-2-benzothiazolyl sulfenamide (DCBS), and N,N-diisopropyl-2-benzothiazole sulfenamide), and guanidine vulcanization accelerators (such as diphenylguanidine (DPG), di-o-tolylguanidine, triphenylguanidine, o-tolylbiguanide, and diphenylguanidine phthalate). Among these, a combination of TBBS and DPG is particularly preferable.

The rubber composition of the present invention can be suitably used for a tread of a studless tire, particularly for a cap tread which is the surface layer of a tread having a multi-layer structure. For example, the rubber composition is suitable for the surface layer (cap tread) of a tread having a two-layer structure consisting of the surface layer and an inner layer (base tread).

The rubber composition of the present invention is applicable to studless tires for vehicles such as trucks and buses and is particularly preferably used for studless tires for passenger vehicles which require high handling stability on ice and snow.

A studless tire can be produced with the rubber composition of the present invention by a usual method. That is, the studless tire can be produced by preparing tire components such as a tread with use of the above rubber composition, assembling the prepared tire components with other components on a tire building machine, and heating the assembly under pressure.

EXAMPLES

The present invention is more specifically described based on Examples. It is noted that the present invention is not limited to these Examples.

In the following, the respective chemical agents used in Examples and Comparative Examples are listed.
NR: RSS#3
BR: BR150B (cis-1,4 bond content: 97% by mass, $ML_{1+4}$ (100° C.): 40, viscosity of a 5% solution in toluene at 25° C.: 48 cps, Mw/Mn: 3.3) produced by Ube Industries, Ltd.
Carbon black: N220 ($N_2SA$: 120 m²/g, average particle size: 23 nm, DBP oil absorption: 115 ml/100 g) produced by Cabot Japan K.K.
Silica: Ultrasil VN3 ($N_2SA$: 175 m²/g) produced by Degussa AG
Silane coupling agent: Si266 (bis(3-triethoxysilylpropyl)disulfide) produced by Degussa AG
Aromatic oil: Process oil NC300S (aromatic hydrocarbon ($C_A$) content: 29% by mass) produced by Japan Energy Corporation
Stearic acid: Kiri produced by NOF Corporation Mixture (mixture of zinc salt of aliphatic carboxylic acid and zinc salt of aromatic carboxylic acid): Activator 73A ((i) zinc salt of aliphatic carboxylic acid: zinc salt of coconut oil-derived fatty acid (number of carbon atoms: 8 to 12), (ii) zinc salt of aromatic carboxylic acid: zinc benzoate, molar ratio: 1/1, zinc content: 17% by mass) produced by Struktol Zinc oxide: Zinc oxide #2 produced by Mitsui Mining & Smelting Co., Ltd.

Age resistor: NOCRAC 6C (N-(1,3-dimethylbutyl)-N'-phenyl-p-phenylenediamine) produced by Ouchi Shinko Chemical Industrial Co., Ltd.

Wax: OZOACE wax produced by Nippon Seiro Co., Ltd.

Sulfur: Sulfur powder produced by Tsurumi Chemical Industry Co., Ltd.

V200: Tackirol V200 (alkylphenol-sulfur chloride condensate represented by the formula (II); n: 0-10; x, y: 2; $R^1$-$R^3$: $C_8H_{17}$ (octyl group); sulfur content: 24% by mass) produced by Taoka Chemical Co., Ltd.

Vulcanization accelerator TBBS: NOCCELER NS (N-tert-butyl-2-benzothiazolylsulfenamide) produced by Ouchi Shinko Chemical Industrial Co., Ltd.

Vulcanization accelerator DPG: NOCCELER D (N,N'-diphenylguanidine) produced by Ouchi Shinko Chemical Industrial Co., Ltd.

Examples 1 to 6 and Comparative Examples 1 to 6

The chemical agents were put into a Banbury mixer in amounts according to the formulation amounts shown in Process 1 in Table 1 or Table 2. They were mixed and kneaded for five minutes so as to raise the outlet temperature to about 150° C. Thereafter, the sulfur, the vulcanization accelerators and, when appropriate, the V200 in amounts shown in Process 2 were added to the mixture obtained through Process 1, and they were mixed and kneaded for three minutes at about 80° C. by an open roll mill, whereby an unvulcanized rubber composition was produced. The produced unvulcanized rubber composition was press-vulcanized for ten minutes at 170° C., so that a vulcanized rubber composition (vulcanized rubber sheet) was produced.

Also, the produced unvulcanized rubber composition was molded into a tread shape and assembled with other tire components. Then, the assembly was vulcanized for 15 minutes at 170° C., and thereby a test studless tire was produced.

The vulcanized rubber sheets and the test studless tires were evaluated in the following ways.

(1) Hardness

In accordance with JIS K 6253 "Rubber, vulcanized or thermoplastic—Determination of hardness", the hardness of the vulcanized rubber sheets was determined at 0° C. by a type A durometer. The determined values of hardness each are expressed as an index based on the value of Comparative Example 1 taken as 100.

(2) Glass Transition Temperature (Tg)

A test piece of a predetermined size was cut out from each of the vulcanized rubber sheets. Then, the temperature dependence curve of tan δ (at from −100° C. to 100° C.) of each test piece was determined with a viscoelasticity spectrometer VES produced by Iwamoto Seisakusho Co., Ltd. under the following conditions: an initial strain of 10%; a dynamic strain of 0.5%; a frequency of 10 Hz and an amplitude of ±0.25%; and a temperature increase rate of 2° C./min. From the resulting temperature dependence curve, the tan δ peak temperature was determined, and this temperature was taken as Tg.

(3) Tensile Test

A No. 3 dumbbell-shaped test piece punched from each of the vulcanized rubber compositions was subjected to a tensile test in accordance with JIS K6251 "Rubber, vulcanized or thermoplastic—Determination of tensile stress-strain properties", so that the tensile strength (TB) of each test piece was determined. The determined values of TB each are expressed as an index based on the value of Comparative Example 1 taken as 100. The larger the index of TB, the higher the strength.

(4) Performance on Ice and Snow (Braking Performance)

The test studless tires were evaluated for on-vehicle performance on ice and snow under the following conditions. Here, studless tires for passenger vehicles, which have a size of 195/65R15 and a DS-2 pattern, were produced as the studless tires, and the tires were mounted on a 2000-cc FR car made in Japan. The test was run on a test course of Sumitomo Rubber Industries, Ltd. in Nayoro, Hokkaido, Japan. The temperature on ice was from −6° C. to −1° C. and the temperature on snow was from −10° C. to −2° C.

Braking performance (brake stopping distance on ice): The brake stopping distance on ice was measured which is the distance required for the car to stop after the brakes that lock up were applied at 30 km/h. Then, with Comparative Example 1 taken as a reference, the braking performance index was calculated from the following formula.

(Braking performance index)=(Brake stopping distance in Comparative Example 1)/(Brake stopping distance of each tire)×100

The larger the index, the better the braking performance on ice and snow.

(5) Performance on Ice and Snow (Handling Stability)

The test studless tires were evaluated for on-vehicle performance on ice and snow under the same conditions as those described above.

Handling performance (evaluation by feeling): The starting, accelerating, and stopping of the above car were evaluated by feeling. In the evaluation, the tire in Comparative Example 1 was regarded as the standard, performance of which was graded 100. Then, grading was performed in such a manner that tires were graded 120 if the test driver judged that their performance was obviously improved, and tires were graded 140 if the test driver judged that their performance was at a high level never seen before.

(6) Wet Grip Performance

With the above test studless tires (having a size of 195/65R15), an actual vehicle running test was performed on a test course with a wet asphalt surface. In the test, grip performance (grip feeling, brake performance, traction performance) was evaluated by feeling. In the evaluation, the performance of the tire in Comparative Example 1 was regarded as the standard and was graded 100. Then, grading was made in such a manner that tires were graded 120 if the test driver judged that their performance was obviously improved, and tires were graded 140 if the test driver judged that their performance was at a high level never seen before.

(7) Abrasion Resistance

The above test studless tires (having a size of 195/65R15) each were mounted on an FF car made in Japan, and the depth of grooves on the tire tread part was measured after the car had run 8000 km. From the measured value, the running distance that makes the depth of the tire grooves decrease by 1 mm was calculated and then the resulting running distance was used in the following formula to calculate the abrasion resistance index.

(Abrasion resistance index)=(Running distance that makes tire groove depth decrease by 1 mm)/(Running distance that makes tire groove depth in Comparative Example 1 decrease by 1 mm)×100

The larger the index, the better the abrasion resistance.

Tables 1 and 2 show the evaluation results of the respective tests.

TABLE 1

|  |  |  | Examples | | | Comparative Examples | | | |
|---|---|---|---|---|---|---|---|---|---|
|  |  |  | 1 | 2 | 3 | 1 | 2 | 3 | 4 |
| Formulation (parts by mass) | Process 1 | NR | 60 | 60 | 60 | 60 | 60 | 60 | 60 |
|  |  | BR | 40 | 40 | 40 | 40 | 40 | 40 | 40 |
|  |  | Carbon black | 5 | 5 | 5 | 5 | 5 | 5 | 5 |
|  |  | Silica | 60 | 60 | 80 | 60 | 80 | 60 | 60 |
|  |  | Silane coupling agent | 4.8 | 4.8 | 6.4 | 4.8 | 6.4 | 4.8 | 4.8 |
|  |  | Aromatic oil | 60 | 60 | 80 | 60 | 80 | 60 | 60 |
|  |  | Stearic acid | — | — | — | 2 | 2 | — | 2 |
|  |  | Mixture | 2 | 3 | 2 | — | — | 0.5 | — |
|  |  | Zinc oxide | 3 | 3 | 3 | 3 | 3 | 3 | 3 |
|  |  | Age resistor | 2 | 2 | 2 | 2 | 2 | 2 | 2 |
|  |  | Wax | 2 | 2 | 2 | 2 | 2 | 2 | 2 |
|  | Process 2 | Sulfur | 1.5 | 1.5 | 1.5 | 1.5 | 1.5 | 1.5 | 3.5 |
|  |  | Vulcanization accelerator TBBS | 1.5 | 1.5 | 1.5 | 1.5 | 1.5 | 1.5 | 1.5 |
|  |  | Vulcanization accelerator DPG | 1.0 | 1.0 | 1.0 | 1.0 | 1.0 | 1.0 | 1.0 |
| Evaluation |  | Hardness (0° C.) | 110 | 110 | 112 | 100 | 102 | 100 | 112 |
|  |  | Tg (° C.) | −65 | −65 | −67 | −65 | −67 | −65 | −65 |
|  |  | Tensile strength | 105 | 103 | 96 | 100 | 91 | 100 | 65 |
|  |  | Performance on ice and snow (braking performance) | 99 | 99 | 95 | 100 | 94 | 100 | 95 |
|  |  | Performance on ice and snow (handling stability) | 110 | 110 | 112 | 100 | 102 | 100 | 112 |
|  |  | Wet grip performance | 105 | 105 | 115 | 100 | 110 | 100 | 115 |
|  |  | Abrasion resistance | 108 | 105 | 95 | 100 | 87 | 100 | 75 |

Table 1 shows that the test studless tires in Examples, produced by using the mixture, showed good braking performance on ice and snow, abrasion resistance, and wet grip performance, and also showed excellent handling stability on ice and snow. On the other hand, the test studless tires in Comparative Examples 1 to 3, produced by using the mixture in a small amount or by using no mixture, showed inferior handling stability on ice and snow, abrasion resistance, and wet grip performance. The test studless tire in Comparative Example 4, produced by using no mixture and containing an increased amount of sulfur (crosslinking agent), showed improvement in handling stability on ice and snow and wet grip performance, but showed a large reduction in abrasion resistance and a decrease in braking performance on ice and snow, and therefore a significant deterioration in performance balance.

TABLE 2

|  |  |  | Examples | | | Comparative Examples | | | | |
|---|---|---|---|---|---|---|---|---|---|---|
|  |  |  | 4 | 5 | 6 | 1 | 2 | 4 | 5 | 6 |
| Formulation (parts by mass) | Process 1 | NR | 60 | 60 | 60 | 60 | 60 | 60 | 60 | 60 |
|  |  | BR | 40 | 40 | 40 | 40 | 40 | 40 | 40 | 40 |
|  |  | Carbon black | 5 | 5 | 5 | 5 | 5 | 5 | 5 | 5 |
|  |  | Silica | 60 | 60 | 80 | 60 | 80 | 60 | 60 | 60 |
|  |  | Silane coupling agent | 4.8 | 4.8 | 6.4 | 4.8 | 6.4 | 4.8 | 4.8 | 4.8 |
|  |  | Aromatic oil | 60 | 60 | 80 | 60 | 80 | 60 | 60 | 60 |
|  |  | Stearic acid | 2 | 2 | 2 | 2 | 2 | 2 | 2 | 2 |
|  |  | Zinc oxide | 3 | 3 | 3 | 3 | 3 | 3 | 3 | 3 |
|  |  | Age resistor | 2 | 2 | 2 | 2 | 2 | 2 | 2 | 2 |
|  |  | Wax | 2 | 2 | 2 | 2 | 2 | 2 | 2 | 2 |
|  | Process 2 | Sulfur | 1 | 1 | 1 | 1.5 | 1.5 | 3.5 | 1 | — |
|  |  | V200 | 1 | 5 | 1 | — | — | — | 10 | 1 |
|  |  | Vulcanization accelerator TBBS | 1.5 | 1.5 | 1.5 | 1.5 | 1.5 | 1.5 | 1.5 | 1.5 |
|  |  | Vulcanization accelerator DPG | 1.0 | 1.0 | 1.0 | 1.0 | 1.0 | 1.0 | 1.0 | 1.0 |
|  |  | Total amount of pure sulfur in sulfur and V200 | 1.2 | 2.2 | 1.2 | 1.5 | 1.5 | 3.5 | 3.4 | 0.2 |
| Evaluation |  | Hardness (0° C.) | 110 | 115 | 112 | 100 | 102 | 112 | 120 | 75 |
|  |  | Tg(° C.) | −65 | −65 | −67 | −65 | −67 | −65 | −65 | −65 |
|  |  | Tensile strength | 105 | 100 | 96 | 100 | 91 | 65 | 75 | 55 |
|  |  | Performance on ice and snow (braking performance) | 99 | 98 | 95 | 100 | 94 | 95 | 90 | 112 |

TABLE 2-continued

|  | Examples | | | Comparative Examples | | | | |
|---|---|---|---|---|---|---|---|---|
|  | 4 | 5 | 6 | 1 | 2 | 4 | 5 | 6 |
| Performance on ice and snow (handling stability) | 110 | 112 | 112 | 100 | 102 | 112 | 115 | 65 |
| Wet grip performance | 105 | 106 | 115 | 100 | 110 | 115 | 115 | 55 |
| Abrasion resistance | 108 | 103 | 95 | 100 | 87 | 75 | 70 | 40 |

Table 2 shows that the test studless tires in Examples, produced by using the alkylphenol-sulfur chloride condensate and adjusting the amount of sulfur, showed the respective performances in an excellently balanced manner. On the other hand, the test studless tire in Comparative Example 5, produced by using a large amount of the condensate and thus containing a large amount of sulfur, showed a large reduction in abrasion resistance and a decrease in braking performance on ice and snow, and therefore a significant deterioration in performance balance. Also, the test studless tire in Comparative Example 6, produced by containing a small amount of sulfur although using an appropriate amount of the condensate, showed a large decrease in handling stability on ice and snow, abrasion resistance, and wet grip performance, and therefore a significant deterioration in performance balance.

The invention claimed is:

1. A rubber composition for a studless tire, comprising:
a rubber component containing natural rubber and butadiene rubber;
an aromatic oil;
silica;
carbon black; and
a mixture of a zinc salt of an aliphatic carboxylic acid and a zinc salt of an aromatic carboxylic acid,
wherein
the total amount of the natural rubber and the butadiene rubber is 30% by mass or more based on 100% by mass of the rubber component,
the amount of the aromatic oil is 45 to 85 parts by mass, the amount of the silica is 30 to 85 parts by mass, and the amount of the mixture is 1 part by mass or more, per 100 parts by mass of the rubber component, and
the proportion of the silica is 45% by mass or more based on 100% by mass of the total amount of the silica and the carbon black.

2. The rubber composition for a studless tire according to claim 1,
wherein the amount of the natural rubber is 30 to 80% by mass and the amount of the butadiene rubber is 10 to 70% by mass, based on 100% by mass of the rubber component.

3. The rubber composition for a studless tire according to claim 1,
wherein the amount of the natural rubber is 30 to 80% by mass and the amount of the butadiene rubber is 10 to 70% by mass, based on 100% by mass of the rubber component, and
the nitrogen adsorption specific surface area of the silica is 80 to 250 $m^2/g$, and the nitrogen adsorption specific surface area of the carbon black is 80 to 200 $m^2/g$.

4. The rubber composition for a studless tire according to claim 1,
wherein the amount of the natural rubber is 30 to 80% by mass and the amount of the butadiene rubber is 10 to 70% by mass, based on 100% by mass of the rubber component, and
the carbon black has an average particle size of 31 nm or smaller and/or a DBP oil absorption of 100 ml/100 g or more.

5. The rubber composition for a studless tire according to claim 1,
wherein the amount of the natural rubber is 30 to 80% by mass and the amount of the butadiene rubber is 10 to 70% by mass, based on 100% by mass of the rubber component, and
the amount of the carbon black is 2 to 50 parts by mass or more, per 100 parts by mass of the rubber component.

6. The rubber composition for a studless tire according to claim 1,
wherein the amount of the natural rubber is 30 to 80% by mass and the amount of the butadiene rubber is 10 to 70% by mass, based on 100% by mass of the rubber component,
the amount of the carbon black is 2 to 50 parts by mass or more, per 100 parts by mass of the rubber component, and
further comprising sulfenamide vulcanization accelerators and/or guanidine vulcanization accelerators.

7. A studless tire comprising a tread produced from the rubber composition according to any one of claim 1, 2, 3, 4, 5, or 6.

* * * * *